US012566958B2

(12) United States Patent　　　　(10) Patent No.:　US 12,566,958 B2
Kurtz et al.　　　　　　　　　　　　(45) Date of Patent:　Mar. 3, 2026

(54) SYSTEM AND METHOD OF TRAINING A NEURAL NETWORK

(71) Applicant: Red Hat, Inc., Raleigh, NC (US)

(72) Inventors: Mark Kurtz, Medford, MA (US); Dan Alistarh, Meyrin (CH)

(73) Assignee: Red Hat, Inc., Raleigh, NC (US)

( * ) Notice: Subject to any disclaimer, the term of this patent is extended or adjusted under 35 U.S.C. 154(b) by 1155 days.

(21) Appl. No.: 17/149,043

(22) Filed: Jan. 14, 2021

(65) Prior Publication Data

US 2021/0216872 A1　Jul. 15, 2021

Related U.S. Application Data

(60) Provisional application No. 62/960,862, filed on Jan. 14, 2020.

(51) Int. Cl.
*G06N 3/082*　(2023.01)
*G06F 17/16*　(2006.01)
*G06N 3/047*　(2023.01)

(52) U.S. Cl.
CPC ............. *G06N 3/082* (2013.01); *G06F 17/16* (2013.01); *G06N 3/047* (2023.01)

(58) Field of Classification Search
CPC ......... G06N 3/082; G06N 3/047; G06F 17/16
See application file for complete search history.

(56) References Cited

U.S. PATENT DOCUMENTS

| | | | |
|---|---|---|---|
| 5,577,166 A | 11/1996 | Mizuno | |
| 9,558,156 B1 | 1/2017 | Bekas et al. | |
| 9,811,775 B2 | 11/2017 | Krizhevsky et al. | |
| (Continued) | | | |

FOREIGN PATENT DOCUMENTS

| | | |
|---|---|---|
| CN | 107832839 | 3/2018 |
| EP | 3 037 980 | 6/2016 |
| (Continued) | | |

OTHER PUBLICATIONS

Yu Qi et a;. , "Activity-dependent neuron model for noise resistance", Neurocomputing, vol. 357, 2019, pp. 240-247, ISSN 0925-2312, https://doi.org/10.1016/j.neucom.2019.04.055. (https://www.sciencedirect.com/science/article/pii/S092523121930640X) (Year: 2019).*

(Continued)

*Primary Examiner* — Markus A. Vasquez
(74) *Attorney, Agent, or Firm* — Kilpatrick Townsend & Stockton LLP

(57)　　　　　　ABSTRACT

A system and a method of training a Neural network (NN) model may include, receiving a pretrained NN model, that may include a plurality of layers, each associated with an activation matrix; selecting at least one, and performing an iterative training process on the layer. The iterative training process may include, applying an activation threshold to the activation matrix of the layer; measuring an accuracy value of the NN model; retraining the layer, while using a bimodal regularization function of one or more activation matrices of the NN model; and repeating the applying, measuring and retraining, while each repetition uses different activation threshold values. This repetition may be repeated until a maximal value of the activation threshold, where the NN model still converges, is found.

18 Claims, 9 Drawing Sheets

S1005: RECEIVING A PRETRAINED NN MODEL, COMPRISING A PLURALITY OF LAYERS, EACH LAYER ASSOCIATED WITH AN ACTIVATION MATRIX.

S1010: SELECTING A FIRST LAYER OF THE PLURALITY OF LAYERS.

S1015: PERFORMING AN ITERATIVE TRAINING PROCESS ON THE FIRST LAYER

S1020: APPLYING AN ACTIVATION THRESHOLD TO THE ACTIVATION MATRIX OF THE FIRST LAYER.

S1025: MEASURING AN ACCURACY VALUE OF THE NN MODEL.

S1030: RETRAINING THE FIRST LAYER.

S1035: REPEATING THE APPLYING, MEASURING AND RETRAINING, EACH REPETITION USING DIFFERENT ACTIVATION THRESHOLD VALUES FROM THE PRIOR REPETITIONS.

S1040: BASED ON THE MEASURED ACCURACY VALUES, DETERMINING AN ACTIVATION THRESHOLD VALUE OF THE FIRST LAYER.

(56) References Cited

U.S. PATENT DOCUMENTS

| | | | |
|---|---|---|---|
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 2010/0076915 | A1 | 3/2010 | Xu et al. |
| 2011/0119467 | A1 | 5/2011 | Cadambi et al. |
| 2013/0138589 | A1 | 5/2013 | Yu et al. |
| 2016/0224465 | A1 | 8/2016 | Morad et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0032487 | A1 | 2/2017 | Ashari et al. |
| 2017/0103313 | A1 | 4/2017 | Ross et al. |
| 2017/0103317 | A1 | 4/2017 | Young |
| 2017/0132496 | A1 | 5/2017 | Shoaib et al. |
| 2017/0169567 | A1 | 6/2017 | Chefd'Hotel et al. |
| 2017/0193361 | A1 | 7/2017 | Chilimbi et al. |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0372202 | A1 | 12/2017 | Ginsburg et al. |
| 2018/0046900 | A1* | 2/2018 | Dally ................. G06F 9/30018 |
| 2018/0096226 | A1 | 4/2018 | Aliabadi et al. |
| 2018/0173571 | A1 | 6/2018 | Huang et al. |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1 | 11/2018 | Kadav et al. |
| 2019/0042250 | A1 | 2/2019 | Anders et al. |
| 2019/0042542 | A1 | 2/2019 | Narayanamoorthy et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0179818 | A1 | 6/2019 | Lee |
| 2019/0197406 | A1* | 6/2019 | Darvish Rouhani .. G06N 20/00 |
| 2019/0212982 | A1 | 7/2019 | Yoda et al. |
| 2019/0303743 | A1 | 10/2019 | Venkataramani et al. |
| 2019/0354894 | A1 | 11/2019 | Lazovich et al. |
| 2019/0370071 | A1 | 12/2019 | Matveev et al. |
| 2019/0370644 | A1 | 12/2019 | Kenney et al. |
| 2019/0392323 | A1* | 12/2019 | Yan ........................ G06N 3/082 |
| 2020/0019847 | A1* | 1/2020 | Krishnamurthy ....... G06F 17/16 |
| 2020/0034710 | A1 | 1/2020 | Sidhu et al. |
| 2020/0097826 | A1 | 3/2020 | Du et al. |
| 2020/0104717 | A1 | 4/2020 | Alistarh |
| 2020/0160181 | A1 | 5/2020 | Zlateski et al. |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |
| 2020/0342301 | A1 | 10/2020 | Miao et al. |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Aimar et al., "NullHop: A Flexible Convolutional Neural Network Accelerator Based on Sparse Representations of Feature Maps," in IEEE Transactions on Neural Networks and Learning Systems, vol. 30, No. 3, pp. 644-656, Mar. 2019, doi: 10.1109/TNNLS.2018.2852335. (Year: 2019).*

Ker et al., "Deep Learning Applications in Medical Image Analysis," in IEEE Access, vol. 6, pp. 9375-9389, 2018, doi: 10.1109/ACCESS.2017.2788044. (Year: 2018).*

Lu et al., "Work-in-progress: a high-performance FPGA accelerator for sparse neural networks," 2017 International Conference on Compilers, Architectures and Synthesis For Embedded Systems (CASES), Seoul, Korea (South), 2017, pp. 1-2, doi: 10.1145/3125501.3125510. (Year: 2017).*

Zhu et al., Sparse Tensor Core: Algorithm and Hardware Co-Design for Vector-wise Sparse Neural Networks on Modern GPUs, In The 52nd Annual IEEE/ACM International Symposium on Microarchitecture (MICRO-52), Oct. 12-16, 2019, pp. 1-13, https://doi.org/10.1145/ (Year: 2019).*

Molchanav et al., "Importance Estimation for Neural Network Pruning", Jun. 25, 2019, pp. 1-11, https://doi.org/10.48550/arXiv.1906.10771 (Year: 2019).*

Deshpande, A beginner's guide to understanding convolutional neural networks, Jul. 20, 2016.

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015.

Lavin et al., "Fast Algorithms for Convolutional Neural Networks", Nov. 10, 2015.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017.

Rusu et al., "Progressive Neural Networks", Sep. 7, 2016.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.

Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document.

Kaya et al., "Scalable sparse tensor decompositions in distributed memory systems", SC'15: Proceedings of the International Conference for High Performance Computing, Networking, Storage and Analysis, IEEE, 2015. (Year: 2015).

Kim et al., "Designing Vector-Friendly Compact BLAS and LAPACK Kernels", SC17, Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.

Papyan et al., "Convolutional neural networks analyzed via convolutional sparse coding." In: The Journal of Machine Learning Research. Jul. 17, 2017 (Jul. 17, 2017) Retrieved on Feb. 20, 2020.

Scardapane et al. "Group sparse regularization for deep neural networks.", In: Neurocomputing. Jul. 2, 2016 (Jul. 2, 2016) Retrieved on Nov. 16, 2019 (Nov. 16, 2019).

Smith et al., "SPLATT: Efficient and parallel sparse tensor-matrix multiplication", 2015 IEEE International Parallel and Distributed Processing Symposium, IEEE, 2015, (Year: 2015).

(56)                References Cited

OTHER PUBLICATIONS

Wozniak et al., "GiMMiK—Generating bespoke matrix multiplication kernels for accelerators: Application to high-order Computational Fluid Dynamics", Computer Physics Communications, vol. 202, 2016, pp. 12-22.

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

Kurtz, Mark, et al. "Inducing and Exploiting Activation Sparsity for Fast Neural Network Inference." Proceedings of the International Conference on Machine Learning. 2020.

Robert Lim; "Methods for Accelerating Machine Learning in High Performance Computing"; University of Oregon—AREA-2019-01.

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Israt Nisa et al.; "Sampled Dense Matrix Multiplication for High-Performance Machine Learning"; 2018 IEEE 25th International Conference on High Performance Computing (Hi PC).

Yang, Huanrui, Wei Wen, and Hai Li. "Deephoyer: Learning sparser neural network with differentiable scale-invariant sparsity measures." arXiv preprint arXiv:1908.09979 (2019).

Yuster, Raphael, and Uri Zwick. "Fast sparse matrix multiplication." ACM Transactions On Algorithms (TALG) 1.1 (2005): 2-13.

Paixao, Crysttian A., and Flávio Codeco Coelho. Matrix compression methods. No. e1049. PeerJ PrePrints, 2015.

Park, Jongsoo, et al. "Faster cnns with direct sparse convolutions and guided pruning." arXiv preprint arXiv:1608.01409 (2016).

https://www.kinematicsoup.com/news/2016/9/6/data-compression-bit-packing-101, published Sep. 6, 2016.

Two sparsities are better than one: unlocking the performance benefits of sparse-sparse networks, Hunter et al., Neuromorph. Comput. Eng. 2, 2022.

* cited by examiner

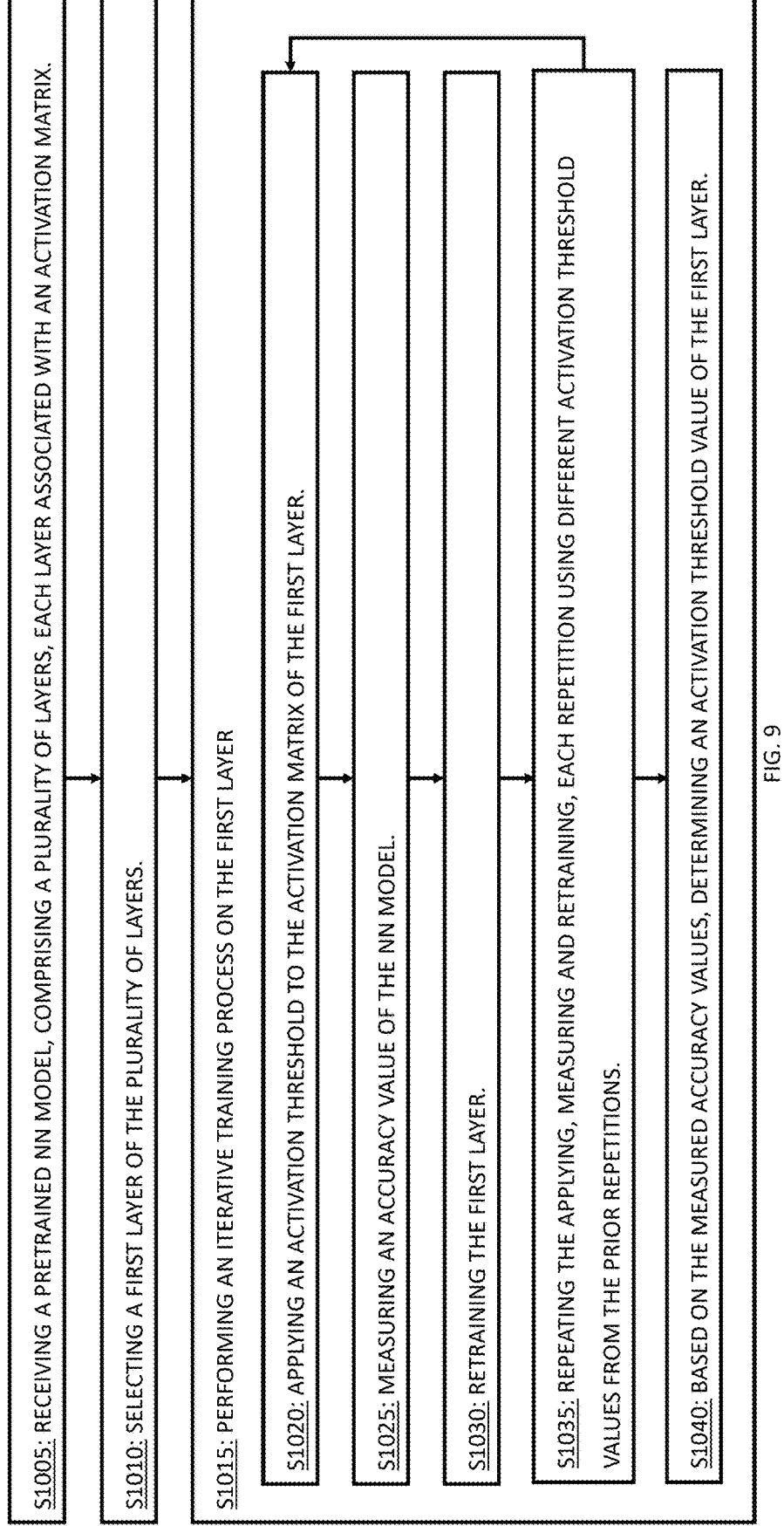

S1005: RECEIVING A PRETRAINED NN MODEL, COMPRISING A PLURALITY OF LAYERS, EACH LAYER ASSOCIATED WITH AN ACTIVATION MATRIX.

S1010: SELECTING A FIRST LAYER OF THE PLURALITY OF LAYERS.

S1015: PERFORMING AN ITERATIVE TRAINING PROCESS ON THE FIRST LAYER

S1020: APPLYING AN ACTIVATION THRESHOLD TO THE ACTIVATION MATRIX OF THE FIRST LAYER.

S1025: MEASURING AN ACCURACY VALUE OF THE NN MODEL.

S1030: RETRAINING THE FIRST LAYER.

S1035: REPEATING THE APPLYING, MEASURING AND RETRAINING, EACH REPETITION USING DIFFERENT ACTIVATION THRESHOLD VALUES FROM THE PRIOR REPETITIONS.

S1040: BASED ON THE MEASURED ACCURACY VALUES, DETERMINING AN ACTIVATION THRESHOLD VALUE OF THE FIRST LAYER.

FIG. 9

SYSTEM AND METHOD OF TRAINING A NEURAL NETWORK

CROSS-REFERENCE TO RELATED APPLICATIONS

This application claims the benefit of U.S. Patent Application No. 62/960,862, filed Jan. 14, 2020, and entitled: "SYSTEM AND METHOD FOR TRAINING A NEURAL NETWORK WITH HIGH SPARSITY OF UNIT ACTIVATIONS", hereby incorporated by reference in its entirety.

FIELD OF THE INVENTION

The present invention relates generally to the field of artificial intelligence. More specifically, the present invention relates to methods and systems for training a neural network model.

BACKGROUND OF THE INVENTION

A artificial neural network (NN or ANN) or Artificial Neural model, e.g. a NN implementing machine learning, may refer to an information processing paradigm that may include neural nodes, organized into layers, with links between the neural nodes. The links may transfer signals between neural nodes and may be associated with weights. A NN may be configured or trained for a specific task, e.g., pattern recognition or classification. Training a NN for the specific task may involve adjusting these weights based on examples. Each neural node of an intermediate or last layer may receive an input signal, e.g., a weighted sum of output signals from other neural nodes, and may process the input signal using a linear or nonlinear function (e.g., an activation function). The results of the input and intermediate layers may be transferred to other neural nodes and the results of the output layer may be provided as the output of the NN. Typically, the neural nodes and links within a NN are represented by mathematical constructs, such as activation functions and matrices of data elements and weights. A processor, e.g. CPUs or graphics processing units (GPUs), or a dedicated hardware device may perform the relevant calculations to train or operate the NN.

The activation of each neural node may be influenced by the activations of other neural nodes (e.g., of a preceding layer), most commonly in a feed-forward pattern. This influence is specified as a set of weights, whose values are learned during the training phase of the network. Given a set of trained weights, one may use an ANN for inference on a new example by: (a) presenting the set of features of the example as an input to the network, and (b) following the values of the learned weights to propagate the resulting signal through the network. Consequently, one may obtain activation of neural nodes at each unit in the network, layer by layer, until the final NN layer. The outputs of the final NN layer may be used to reach a decision regarding the given sample. Such a decision may, for example, include assignment of the given example to a class of a predefined set classes.

One of the key difficulties when executing ANNs on computer hardware is that the number of input features is very large. Additionally, in order to reach good accuracy, the number of layers and the complexity of each layer may also be very large. The resulting high computational footprint makes ANNs very difficult to execute and train. For example, currently available NN models for classifying images, such as the ResNet50 architecture may have nearly 26 million different trainable parameters or weights, that may be organized in 53 distinct layers.

As known in the art, a NN can be described by having its weights and inputs represented as matrices, and the computation of the NN represented as a sequence of multiplications of these matrices. An important property of these matrices, herein referred to as sparsity, may have substantial influence on the throughput of matrix multiplication algorithms. A matrix may be referred to as sparse if it contains a large number of entries that are zero or null. During matrix multiplication, if the computations related to the zero elements are skipped, then the overall computation may be reduced, and the throughput of matrix multiplication may consequently be increased.

Given the high computational cost of executing such models, a wide set of sparsification techniques have been developed in order to reduce the computational cost. For example, currently available systems may employ sparsification of weights of one or more layers of a neural network, so that nullified weights may not participate in the calculation of an output of the one or more NN layers.

The general idea behind these techniques is that many of the weights in an original, pretrained ANN may be redundant, and may not contribute significantly to the network's output. For instance, one standard way of inducing sparsity is to rank the weights in a neural network according to their strength, and subsequently remove a fraction or portion of the weights by setting all the matrix entries corresponding to them to 0. If this sparsification process is performed properly, then a large fraction of the weights can be removed without loss of accuracy. In other words, a weight-sparsified NN model may have the same accuracy as an original, pretrained NN model, and may be executed more efficiently or quickly, since some of the computations related to the zero elements may be skipped. These enhancements are applicable in some form to all computational platforms, such as CPUs and GPUs.

SUMMARY OF THE INVENTION

Embodiments of the invention may include a method of training a NN model by at least on processor, as elaborated herein. Embodiments of the method may include, for example, receiving a pretrained NN model, that may include a plurality of layers, where each layer may be associated with an activation matrix. Embodiments of the invention may select a first layer of the plurality of layers, and perform an iterative training process on the first layer.

According to some embodiments, the iterative training process may include, for example, applying an activation threshold to the activation matrix of the first layer; measuring an accuracy value of the NN model; retraining the first layer; and repeating the applying, measuring, and retraining, while each repetition uses different activation threshold values from the prior repetitions. Embodiments of the invention may determine an activation threshold value of the first layer, based on the measured accuracy values.

According to some embodiments, applying the activation threshold to the activation matrix may include nullifying elements of the activation matrix that are below the activation threshold.

Additionally, determining the activation threshold value may include selecting a maximal activation threshold value, among the different activation threshold values of all repetitions, that also corresponds to a measured accuracy value that exceeds a predefined accuracy threshold.

Embodiments of the invention may, during an inference stage: compress content of nodes of the first layer, that correspond to non-zero elements of the activation matrix, into a first vector register; load elements of a kernel matrix of a subsequent layer into a second vector register; and infer, or apply the kernel matrix of the subsequent layer on content of nodes of the first layer by performing a vector multiplication and accumulation (MAC) operation between the first vector register and the second vector register.

According to some embodiments of the invention, retraining the first layer may include, for example, calculating a loss function of the NN model; and performing gradient-based training of the first NN layer, based on the loss function.

According to some embodiments of the invention, the loss function may include an activation regularization factor, adapted to increase sparsity of the activation matrix of the first layer, as elaborated herein. In some embodiments, the activation regularization factor may be, or may include a bimodal regularization function of one or more (e.g., all) activation matrices of the NN model.

For example, the bimodal regularization function may be, or may include a squared Hoyer function, as elaborated herein.

According to some embodiments of the invention, retraining the first layer may include training the first layer so as to adjust one or more NN weight values of the first layer, while "freezing" or keeping values of NN weights of other layers of the NN model unchanged. Embodiments may proceed to repeat the iterative training process with one or more second layers (e.g., all layers) of the NN model, to determine an activation threshold value of the one or more second layers.

According to some embodiments of the invention, applying an activation threshold to the activation matrix may include: allowing a value of a neural node of the layer to be transmitted to a subsequent layer of the NN if it surpasses the activation threshold value; and otherwise preventing the value of the neural node, from being transmitted to the subsequent layer of the NN.

Embodiments of the invention may include a method of training a NN model by at least on processor, as elaborated herein. Embodiments of the method may include, for example, receiving a pretrained NN model; retraining at least one layer of the NN, while using a bimodal regularization function as a regularization factor, as elaborated herein; producing a sparse activation matrix of the at least one layer by applying an activation function on the output of the layer; and inferring the NN on an input data element, using the sparse activation matrix of the at least one layer.

According to some embodiments of the invention, the activation function may be configured to: (a) transfer an output value of the at least one layer to the activation matrix if it surpasses an activation threshold, and (b) transfer a null value to the activation matrix if the output value does not surpass the activation threshold.

According to some embodiments of the invention, retraining the at least one layer may include, for example, calculating an accuracy value of the NN; and determining a maximal value of the activation threshold, for which the accuracy value is above a predefined accuracy threshold value.

According to some embodiments of the invention, determining a maximal value of the activation threshold may include, for example, (a) training the NN model in a predetermined number of training epochs; (b) determining whether the NN model may be converging or diverging, based on the calculated accuracy value; (c) increasing or decreasing the activation threshold based on said determination; and (d) repeating steps (a) through (c), until a maximal value of the activation threshold, where the NN model still converges, is found.

Embodiments of the invention may include a system of training a NN model, as elaborated herein. Embodiments of the system may include: a non-transitory memory device, wherein modules of instruction code may be stored, and at least one processor associated with the memory device, and configured to execute the modules of instruction code. Upon execution of said modules of instruction code, the at least one processor may be configured to: receive a pretrained NN model, that may include a plurality of layers, each layer associated with an activation matrix; select a first layer of the plurality of layers; and perform an iterative training process on the first layer. The iterative training process may include, for example, applying an activation threshold to the activation matrix of the first layer; measuring an accuracy value of the NN model; retraining the first layer; repeating the applying, measuring and retraining, each repetition using different activation threshold values from the prior repetitions; and based on the measured accuracy values, determining an activation threshold value of the first layer.

According to some embodiments of the invention, the at least one processor may be configured to retrain the first layer by: calculating a loss function of the NN model; and performing gradient-based training of the first NN layer, based on the loss function. Additionally, the loss function may include a bimodal regularization function. For example, the bimodal regularization function may be, or may include a square Hoyer function of one or more (e.g., all) activation matrices of the NN model.

According to some embodiments, the bimodal regularization function may be adapted to change a distribution of output elements the first layer, so as to split these elements into a high-end modality and a low-end modality, as elaborated herein.

According to some embodiments, the at least one processor may be configured to, during an inference stage: compress content of nodes of the first layer, that correspond to non-zero elements of the activation matrix, into a first vector register; load elements of a kernel matrix of a subsequent layer into a second vector register; and infer the kernel matrix of the subsequent layer on content of nodes of the first layer by performing a vector MAC operation between the first vector register and the second vector register. Compressing the content of nodes of the first layer may include, for example, applying a Compressed Sparse Row (CSR) algorithm on a vector that includes content of nodes of the first layer, to produce a non-zero representation, also referred herein as a "compressed" representation of the nodes of the first layer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 is a schematic flow diagram, depicting a method of training a neural network model, according to some embodiments of the invention.

Figures 1A, 1B:
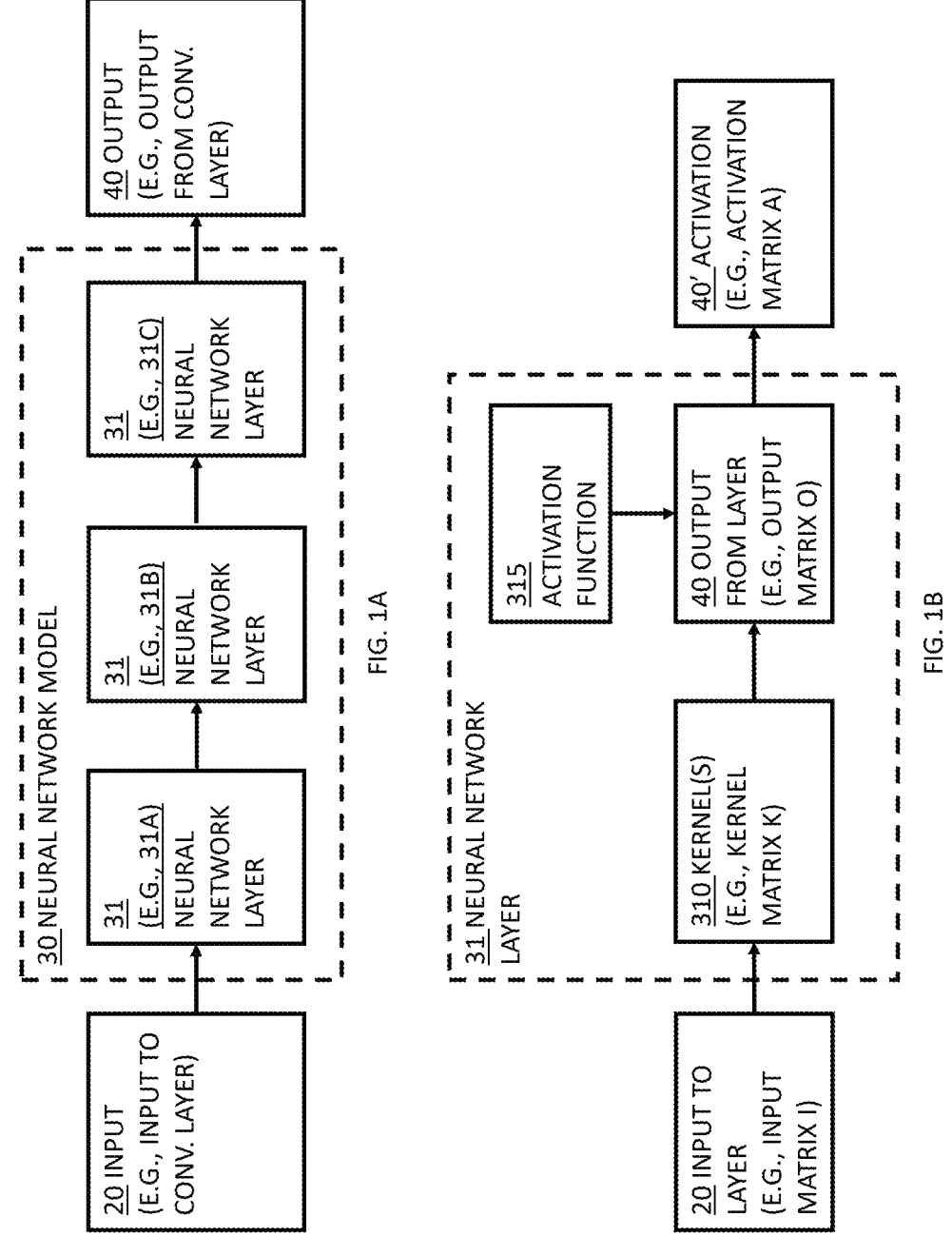
FIG. 1A and FIG. 1B are schematic block diagrams, depicting an example of a multi-layered NN model 30, as known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIGS. 1A and 1B, which are schematic block diagrams, depicting an example of a multi-layered NN model 30, as known in the art. As shown in the example of FIG. 1A, NN model 30 may be trained to receive an input data element 20, and perform a feed forward computation to produce an output data element 40. NN model 30 may include a plurality of layers 31, and the feed forward computation of output data element 40 may include a series of layer-level 31 computations.

As shown in the example of FIG. 1B, each layer-level 31 computation may be represented by an operation of matrix multiplication; a first input matrix 20 of a first layer may be multiplied by a weight matrix or kernel matrix 310 of the first layer, to produce an output matrix 40 of the first layer. The output matrix 40 of the first layer may, in turn, serve as an input matrix 20 of a subsequent, second layer, and so on.

As shown in the example of FIG. 1B, an input data element 20, represented by input matrix I may be multiplied by a kernel data element 310 represented by a kernel matrix K, to produce an output data element 40, represented by an output matrix O. In some embodiments of the invention, an activation function 315 may be applied on output matrix O to produce an activation data element 40', such as an activation matrix A.

In other words, a kernel (K) may be inferred on an input (I) data element 20 to produce an output (O) data element 40. An activation function 315 such as a Rectified Linear Unit (ReLU) function may sparsify or prune output (O) data element 40 according to the ReLU activation function, to produce an Activation (A) data element 40', that is a sparse version of output matrix O.

Embodiments of the present invention may reduce the computational cost of inference and training of ANNs by enforcing that the set of activations (e.g., activation matrices A of one or more layers) in the NN model is sparse.

Embodiments of the invention may combine or integrate novel techniques for boosting the execution of NN models (e.g., improving latency and/or throughput of NN model computation), based on sparsification of activation matrices, as elaborated herein.

According to some embodiments, a first technique of sparsification of activation matrices may employ a new type of activation function for units or layers of an ANN, called Forced-Activation-Threshold Rectified Linear Unit (FA-TReLU). The FATReLU function may be specifically designed to increase the activation sparsity of an arbitrary ANN, as elaborated herein. The term "activation sparsity" may refer herein to a level of sparsity (e.g., a number or a ratio of zero-valued elements) in one or more specific activation matrices 40' of a NN model 30.

Additionally, a second technique of sparsification of activation matrices may be referred herein as Activation-Sparsity-Boosting (AS-Boosting), and may include a process by which high sparsity in of activation matrices is induced as part of the NN model's training, as elaborated herein.

Embodiments of the invention may aim to leverage that in some example implementations most NN layers tend to generate activation matrices that are naturally sparse, and boost this phenomenon.

Figure 2:
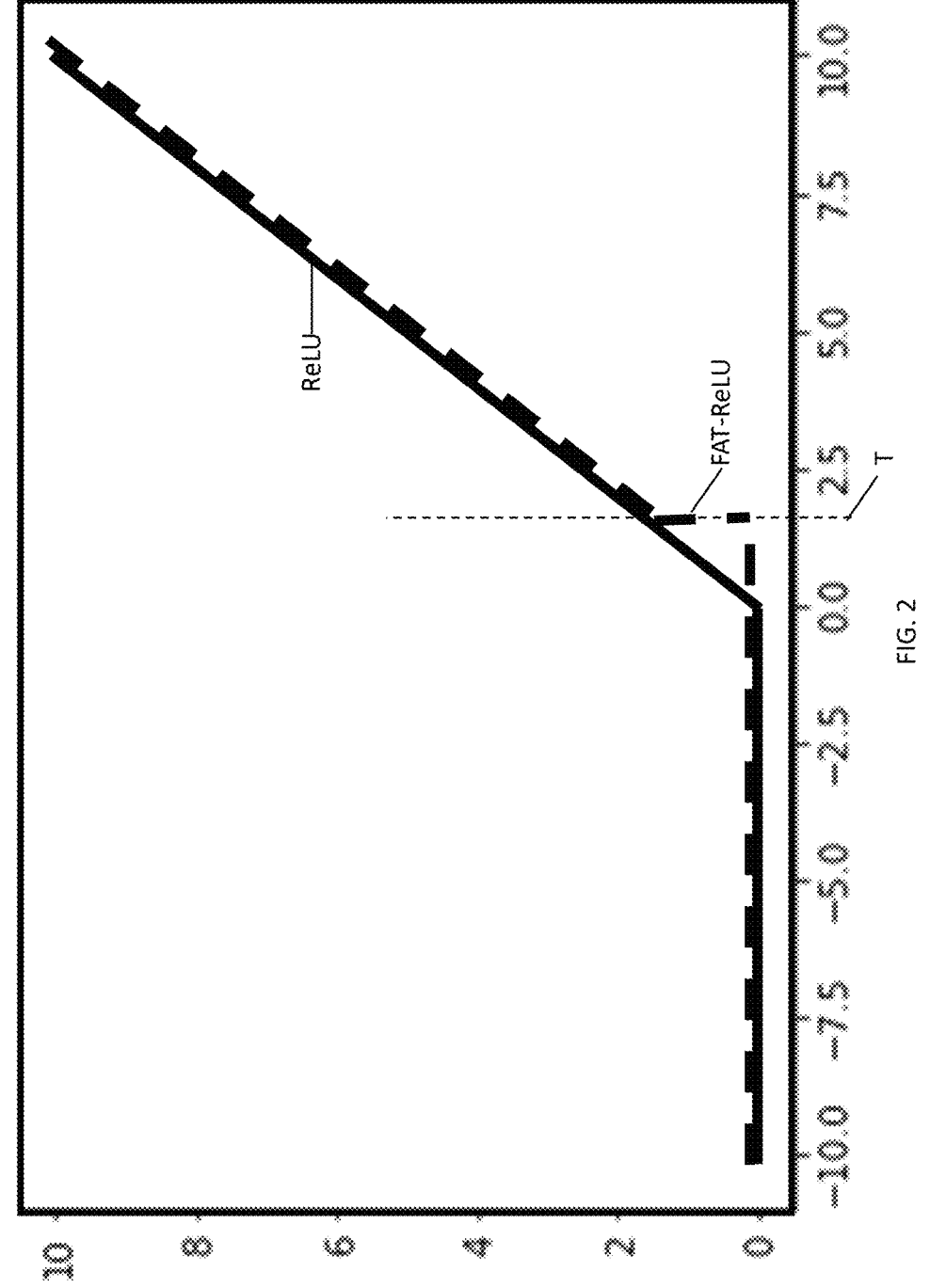
FIG. 2 is a schematic diagram, depicting activation functions that may be used during execution (e.g., training and/or inference) of a NN model according to some embodiments.

Reference is now made to FIG. 2, which is a schematic diagram, depicting two activation functions that may be used during execution (e.g., training and/or inference) of a NN model, according to some embodiments.

As shown by the solid line of FIG. 2, a first activation function is a Rectified Linear Unit (ReLU) activation function. As known in the art, ReLU is commonly used as an activation function for modern neural networks. As shown in the example of FIG. 2, ReLU takes or converts any negative output to 0. Therefore it may be expected that given a uniformly random set of input examples, with a zero mean value, half of the activation matrix elements produced by these inputs would be zero.

In other words, it may be expected by a person skilled in the art that, given a standard neural network architecture such as a convolutional neural networks (CNN) for image classification, and a uniformly random set of input examples, the standard ReLU activation function may produce an activation matrix having a 50% sparsity ratio.

Figure 3:
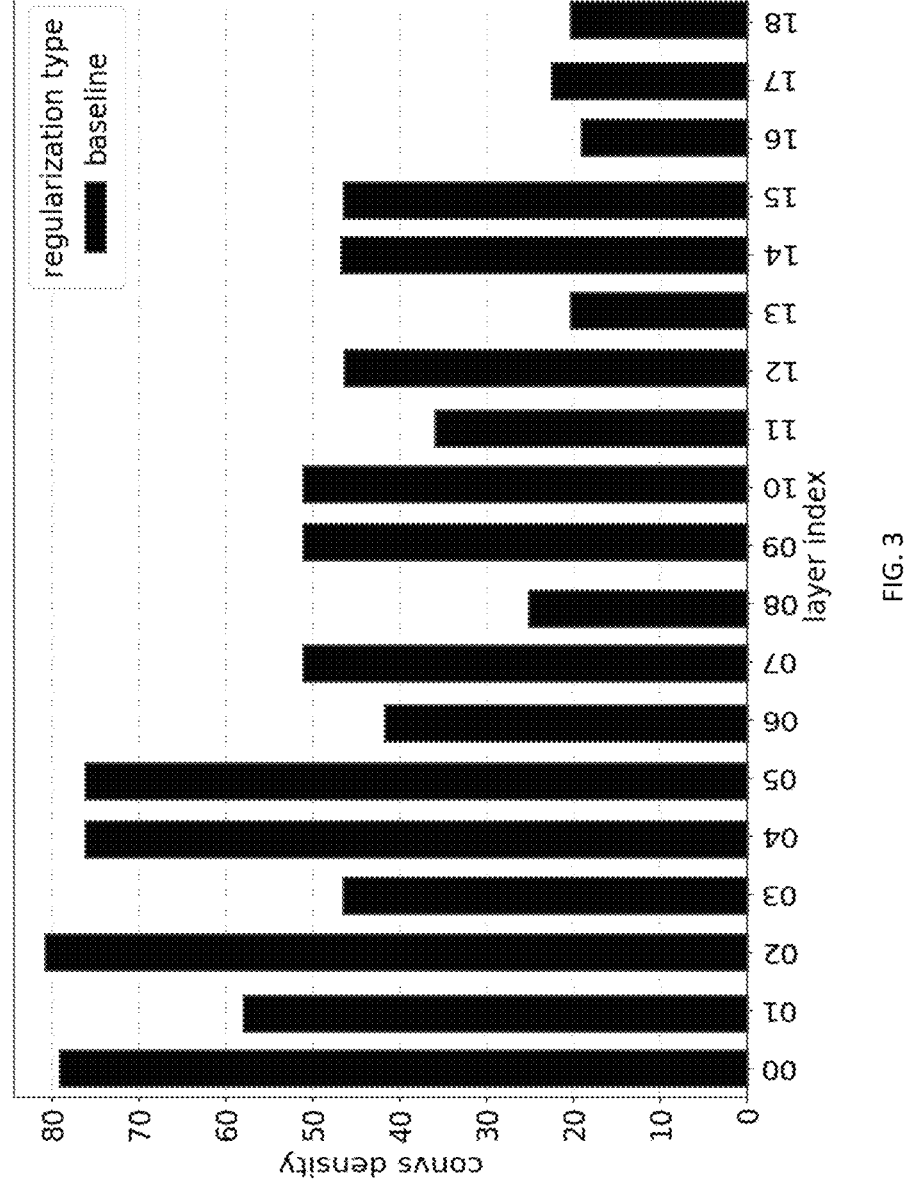
FIG. 3 is a graph, depicting density of activation matrices of various layers of a pretrained NN model.

Reference is now made to FIG. 3, which is a graph depicting density of activation matrices of various layers of a pretrained NN model. The example of FIG. 3 pertains to a fully-trained, ResNet18 NN model architecture, following a standard training process. The term "standard" may be used in this context to indicate training as known in the art, by currently available systems for training NN models, without any modification to the architecture or to the training process as included in the present invention. As known in the art, ResNet18 is a popular NN model for image classification, that may be trained using the ImageNet dataset.

The data presented in FIG. 3 may be referred to as baseline data, of a baseline NN. The term "baseline" may refer herein to a NN that was trained as known in the art, e.g., without applying methods of NN training according to embodiments of the invention. Such baseline data may demonstrate the benefits of training a NN model according to embodiments of the invention, as elaborated further herein.

As shown in FIG. 3, the bars represent density of non-zero activation matrices for the baseline network, pertaining to each NN layer. It may be noticed that the average density decreases significantly with the layer indices (e.g., as we go further into the network).

Upon examination of FIG. 3, it can be seen that, although naturally-occurring sparsity is above the random (50%) level, especially on the final layers, this would be still below the high levels of sparsity which may be required for embodiments of the invention to result in computational speedups for the execution of NN architectures on CPUs or GPUs. Specifically, exploiting sparse execution adds non-negligible overheads, for instance due to more complex data representations and lower processor utilization, and therefore requires the expected occurring sparsity levels to be significant. As demonstrated herein (e.g., in relation to FIG. 4), embodiments of the invention may boost the activation sparsity of layers to high levels, to enable computational speedup of NN execution.

Referring back to FIG. 2, a second activation function, depicted by the broken line, may be a FATReLU activation function. The high-level intuition behind FATReLU is that it is designed to increase the activation sparsity level of a layer by increasing the value of the threshold T below which all values are mapped to 0, from 0 (as is the case for ReLU) to a dynamically adaptive threshold value T>0, where T may be any positive value. The resulting activation function is described mathematically in example Equation 1 below, for a fixed value of an activation threshold T (e.g., T=1).

$$FATRLU_T(x) = \begin{cases} x, & \text{when } x \geq T; \\ 0, & \text{otherwhise.} \end{cases} \qquad \text{Equation 1}$$

where x is an independent variable, and T is the activation threshold value.

Intuitively, the goal of FATReLU is to increase activation sparsity by "cleaning up" small, but non-zero activation values, which are unlikely to affect the outcome of a NN computation. For example, during NN computation of a classification decision, FATReLU may omit elements of this computation by setting small (e.g., beneath threshold value T) activation values (e.g., elements of activation matrix 40') to 0. It may be appreciated by a person skilled in the art that such small activation values would not be set to 0 other, currently available standard activation functions, such as the sigmoid activation function, the hyperbolic tangent activation function, the standard ReLU activation function, etc.

Additionally, or alternatively, embodiments of the invention may apply additional mechanisms, in synergy with the dynamic setting of the FATReLU threshold values, to further increase the sparsity of activation matrices in a NN, as elaborated herein.

As elaborated herein, a first mechanism for increasing the sparsity of activation matrices in a NN may be referred to as "dynamic sparsity boosting", and may include adjusting the thresholds of the layer activations, in a layer-wise fashion (e.g., layer after layer), without incurring loss of accuracy in the NN computations, such as a loss of classification accuracy.

As known in the art, NNs may be trained during a process commonly referred to as "back propagation", to minimize a value of a loss function. The loss function may include a "regularization factor" or "penalty factor", adapted such that specific features or characteristics of the NN may be achieved during the training process.

As elaborated herein, a second mechanism for increasing sparsity may include applying a regularization factor, that may be adapted to increase sparsity of activation matrices in the NN during the back propagation process.

For example, embodiments of the invention may add a penalty factor or regularization factor to the loss function of the NN, in the form of a squared Hoyer regularization factor or function, adapted to increase the sparsity of activation matrices, as elaborated herein. The Hoyer sparsity function may be defined, for an arbitrary vector $\vec{v}$ as elaborated in the example of Equation 2, below, $$H(\vec{v}) = \frac{\left(\sum_{i=1}^{d} |v_i|\right)^2}{\sum_{i=1}^{d} v_i^2} \qquad \text{Equation 2}$$

where H is the square Hoyer function; $\vec{v}$ is the arbitrary vector; d is the dimension (e.g., length) of the arbitrary vector $\vec{v}$; and $v_i$ are elements of arbitrary vector $\vec{v}$ in index i.

In currently available systems for executing NNs, most of the computation necessary to train or perform inference in the context of neural networks is performed by specialized, massively parallel hardware devices, such as graphics processing units (GPUs). Such devices typically have thousands of relatively weak compute cores, specialized to perform "regular," predictable computation, which follows exactly the same control flow pattern, such as massive matrix multiplications.

This typical "lock-step" execution strategy, in which all cores execute identical computation steps at the same time, is well suited to large matrix or tensor operations where the operands are dense, e.g., have few, or no non-zero values. However, it is by now well understood that the matrix operations arising in the context of neural networks are often sparse, in the sense that operands contain a significant fraction of zero values, or can be sparsified without significantly impacting the behavior of the network, and in particular while preserving its accuracy on a given task. In turn, this sparsity can be exploited on more complex architectures, such as CPUs, to reduce the amount of computation, and therefore reduce running times.

One of the main approaches for reducing the significant amount of computation which must be performed by a neural network is to sparsify (e.g., set to zero) a non-trivial fraction of the weights (e.g., elements of Kernel Matrix 310 of FIG. 1B) corresponding to the neural nodes in the network. Setting weights to zero may neutralize the corresponding multiplications (by the weights), and therefore may reduce the computational load.

Given the considerable attention received by currently available methods of pruning NN weights, it is surprising that sparsifying the activation maps (e.g., elements of Activation Matrix 40' of FIG. 1B) in neural networks has received relatively little attention. The fact that a non-trivial fraction of the activations is zero is a natural consequence of the structure of activation functions such as the ReLU activation function. This observation has been leveraged by hardware accelerators, observing that, generally, the activations in the last few layers of NNs such as convolutional neural networks (CNNs) have high sparsity, whereas the sparsity in the layers close to the input is lower, as depicted FIG. 3.

As known in the art, NNs such as NNs used for classification tasks typically produce, for each class i, an output $z_i$, that may be commonly referred to as a "logit". Such logit may encode the likelihood that a given example (e.g., an image of an object) should be classified to a specific class i (e.g., a type of object). Here, i cycles over all the K output classes (e.g., the object types). For each class i, logits $z_i$ may be transformed or converted into probabilities $q_i$ by comparing each $z_i$ to the other logits, as elaborated in Equation 3, below. As known in the art, logits $z_i$ may be converted to probabilities $q_i$ in an NN layer commonly referred to as a "softmax" layer.

$$q_i = \frac{\exp(z_i)}{\sum_j^K \exp(z_j)} \qquad \text{Equation 3}$$

where K is the number of all output classes; i is an index of a specific class in K; $q_i$ is the probability that a specific example is correctly classified as pertaining to class i; and $z_i$ is the logit of class i.

As known in the art, a loss value for a specific input data element, or "example", as commonly referred to in the art, may be calculated according to the cross-entropy function, between the softmax-normalized outputs and the ground-truth distribution. In other words, the loss value of an example "ex" may be calculated according to example Equation 4, below.

$$\text{loss}(ex) = -\sum_{i=1}^K \log[q_i(ex)]d_i(ex) \qquad \text{Equation 4}$$

where loss(ex) is the loss value for a specific example (ex); and $d_i$ is the ground-truth distribution of class i. For example, in the basic case in which each example ("ex") pertains to a single ground-truth class, the target ground-truth distribution $(d_i)_{i=1, \ldots, K}$ may have a value $d_j=1$ for the correct class j, and 0 otherwise.

It may be appreciated by a person skilled in the art that the cross-entropy loss function of Equation 4 is differentiable with respect to the logits $q_i$, and can therefore be used for gradient-based training of deep models. However, in practice, one may require balancing this ground-truth loss of Equation 4 with a regularization factor, which may encode some desirable characteristics of the NN model. Therefore, Equation 4 may be rewritten to yield example Equation 5:

$$\text{loss}(ex) = -\sum_{i=1}^K \log[q_i(ex)]d_i(ex) + \lambda \text{Regularizer}(x) \qquad \text{Equation 5}$$

where Regularizer(x) is the regularization factor or function, according to an arbitrary variable x, and $\lambda$ is a regularization parameter which may dictate a weight or impact of the regularization factor on the loss value.

As elaborated herein, embodiments of the invention may be configured to utilize a regularization factor or function so as to: (a) induce sparsity in the activation matrices 40' of a NN, and (b) maintain a predetermined level of accuracy (e.g., classification accuracy) of the NN. Hence, it is of particular importance to select an appropriate regularization factor that best suits this function.

As known in the art, one form of a commonly used regularization term is referred to as the "L1" regularization, which includes summing the absolute values of the terms and adding them to the loss, as elaborated in example Equation 6, below:

$$L_1(\vec{v}) = \sum_{i=1}^d |v_i| \qquad \text{Equation 6}$$

where $L_1$ is the L1 regularization function; $\vec{v}$ is the arbitrary vector; d is the dimension (e.g., length) of the arbitrary vector $\vec{v}$; and $v_i$ are elements of arbitrary vector $\vec{v}$ in index i.

For example, $\vec{v}$ may be a vector that includes all the elements in an activation matrix A. As a level of sparsity of matrix A increases (e.g., as more zero terms are present in matrix A), the penalty incurred by the L1 regularization factor on the loss value decreases.

Embodiments of the invention may employ a square Hoyer function as elaborated in Equation 2, as a regularization factor, that may have improved characteristics in relation to the L1 regularization function.

Figures 4A, 4B, 4C:
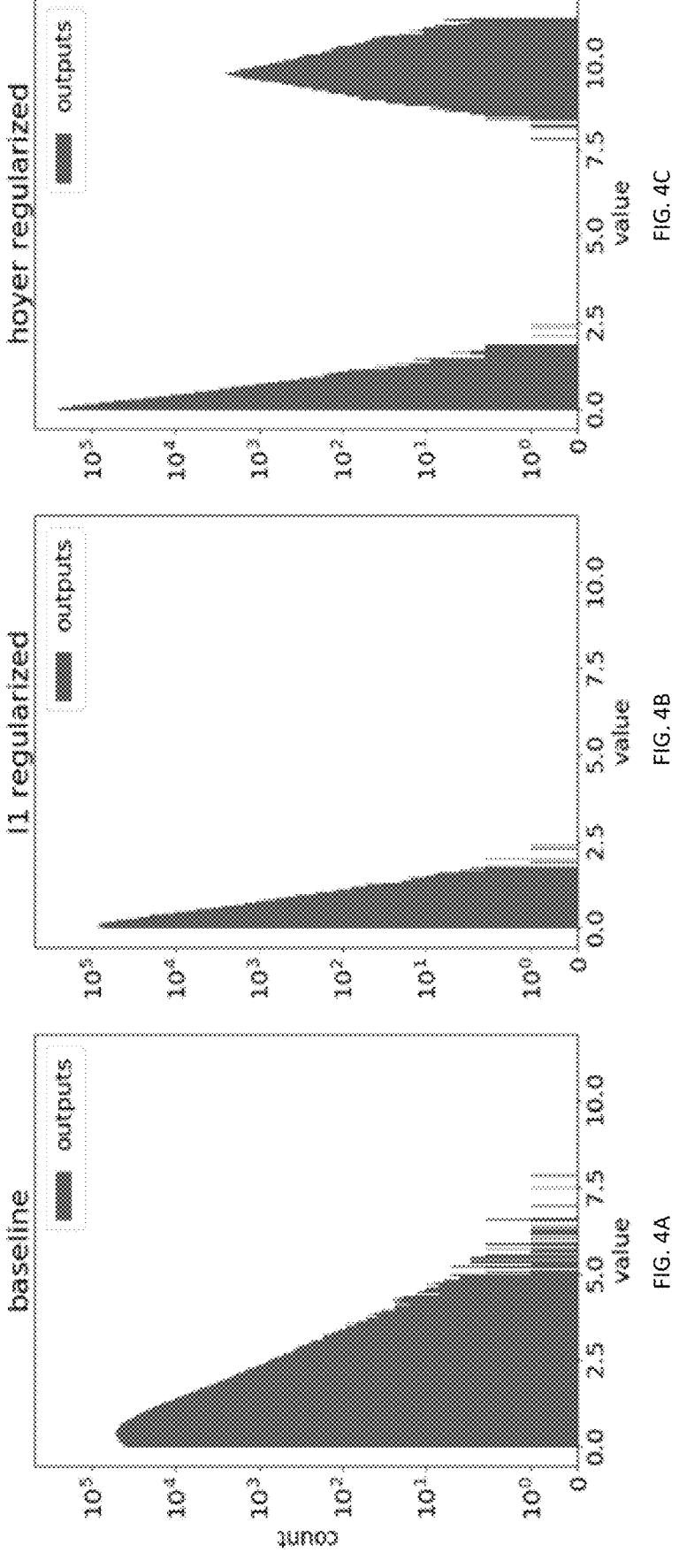
FIGS. 4A, 4B and 4C are graphs, depicting the effect of different regularization functions on a given vector of activation matrix elements.

Reference is now made to FIGS. 4A, 4B and 4C, which depict the effect of different regularization functions on a given vector of output matrix 40 elements.

FIG. 4A depicts a first distribution of values, of a baseline vector of elements included in a baseline output matrix 40. The baseline output matrix 40 of FIG. 4A pertains to a NN layer in a ResNet18 NN model. The example ResNet18 NN model was trained for image processing using the ImageNet database.

FIG. 4B depicts a second distribution of values of elements of the output matrix 40, pertaining to the same NN layer. The output matrix 40 elements of FIG. 4B were obtained by training the NN using the ImageNet database, where the L1 function was used as a regularization factor. It may be observed that the distribution of output matrix 40 elements in FIG. 4B is "condensed" toward lower values, in comparison to the baseline values depicted in FIG. 4A.

It has been experimentally shown that in some examples low-valued elements of output matrix 40, flowing through network NN may correspond to noise, and that large values of output matrix 40 normally correspond to or represent signals that are necessary for the functionality of network NN 30. Therefore, the regularization depicted in FIG. 4B, using the L1 function of Equation 6 as a regularization factor, may represent a naïve approach, that may hinder the accuracy of NN 30.

For example, NN 30 may be adapted to classify an object in an image. For example, when classifying an image of a dog, there may be some features that a layer 31 (e.g., 31A) of NN 30 will detect, e.g., whether an eye or an ear is present. Such features should flow through NN 30 to subsequent layers (e.g., 31B) for further combination and detection. A naïve regularization factor, e.g., a regularization factor that includes the L1 function, may regularize this signal (e.g., existence of an eye) and may thus hinder the output from layer 31A, including both noise and the actual signal (required for layer 31B). This is because the L1 function penalizes all values according to their magnitude.

In other words, naïve regularization factors such as the commonly used L1 heavily penalize important, high valued signals or elements of output matrix 40, where higher values add more of a penalty than lesser values. Therefore, it may be appreciated that commonly used regularization factors, e.g., the L1 function, may not be optimal for producing sparse activation matrices 40' while preserving the accuracy of NN model 30.

FIG. 4C depicts a third example distribution of values of elements of output matrix 40, pertaining to the same NN layer. The output matrix 40 elements of FIG. 4C were obtained by training the NN using the ImageNet database, where a bimodal function, such as the square Hoyer function was used as a regularization factor. As shown in FIG. 4C, embodiments of the invention may use a bimodal function, such as the square Hoyer function as a regularization factor.

The term "bimodal function" may be used in this context to refer to any function that may split the distribution of a vector of elements into two or more modalities. For example, as depicted in FIG. 4C, it may be observed that the bimodal function is adapted to change the distribution of output matrix 40 elements (or subsequently—activation matrix 40' elements) of layer 31, so as to split the elements of output matrix 40 into (a) a high-end modality or region, and (b) a low-end modality or region, in comparison to the baseline values depicted in FIG. 4A.

As shown in FIG. 4C, the bimodal function (e.g., the square Hoyer function) may change the distribution of a vector of elements by (a) "pushing" low element values toward zero; and (b) allowing representation of high element values. In this example, where the vector of elements represents elements of output matrix 40, low-valued elements of output matrix 40 may be diminished, and high-valued elements of output matrix 40 may be increased.

In other words, training NN 30 while using a bimodal function such as the square Hoyer function as a regularization factor, may produce a bimodal distribution of elements of output matrix 40, as shown in the example of FIG. 4C. Other bimodal functions (e.g., other than the square Hoyer function) may also be used.

Embodiments of the invention may benefit from the new distribution of output matrix 40 elements by the bimodal (e.g., square Hoyer) function. For example, by "pushing" low output values of output matrix 40 toward zero, embodiments of the invention may apply a FATReLU threshold function on a larger portion of output matrix 40 elements. Embodiments may thus gain larger sparsity of activation matrix 40', and thus boost NN computation.

Additionally, and in contrast to other forms of regularization (e.g., the commonly used L1 regularization function of Equation 6), the bimodal function (e.g., square Hoyer) may allow at least some high-valued elements of output matrix 40 not to be penalized, be preserved in activation matrix 40', and be transferred to subsequent layers 31 of NN 30.

Example equation 7 below elaborates the derivative of the bimodal (e.g., square Hoyer) function by an element of an arbitrary vector v:

$$\frac{\delta H(\vec{v})}{\delta v_j} = 2\mathrm{sign}(v_j) = \frac{\sum_{i=1}^{d} |v_i|}{\left(\sum_{i=1}^{d} v_i^2\right)^2} \left( \sum_{i=1}^{d} v_i^2 - |v_j| \sum_{i=1}^{d} |v_i| \right) \qquad \text{Equation 7}$$

where H is the square Hoyer function; $\vec{v}$ is the arbitrary vector; i and j are indices of elements (e.g., $v_i, v_j$) in vector $$\vec{v}; \frac{\delta H(v)}{\delta v_j}$$

is the derivative of the Hoyer square function by element $v_j$ of vector $\vec{v}$; sign($v_j$) is the sign (e.g., "+" or "−") of element $v_j$, and d is the dimension (e.g., length) of the arbitrary vector $\vec{v}$.

By studying the derivative of the bimodal (e.g., square Hoyer) function as elaborated in Equation 7, it may be appreciated that large values of output matrix 40 diverge from 0 while small values of output matrix 40 are pushed toward 0. In other words, small values which may include, or may correspond to noise may be regularized and pushed towards 0, later to be nullified by the FATReLU activation function 315. However, large values of output matrix 40, which may correspond to a signal, may not be regularized, and may persist or propagate into activation matrix 40' and to subsequent layers 31 of NN 30.

As shown in the example of FIG. 4C, the distribution of elements of output matrix 40 is normalized logarithmically.

Therefore, the areas included in the charts of FIGS. 4A, 4B and 4C is not equivalent. By comparing FIG. 4B and FIG. 4C, it may be appreciated that the L1 regularization factor (FIG. 4B) may limit or restrict the distribution of values of output matrix 40, and therefore cannot reach as high of sparsity levels before affecting the overall accuracy of NN model 30. In comparison, the bimodal (e.g., square Hoyer) function may allow the distribution of values of output matrix 40 to reach higher values, and thus enable embodiments of the invention to reach higher levels of sparsity (in comparison to L1) before affecting the overall accuracy of NN model 30.

As elaborated herein, embodiments of the invention may use the square Hoyer function, which is usually employed to measure the sparsity of a vector, as a regularization term on the activations of every layer. In such embodiments, the loss function of Equation 4 and/or Equation 5 may be rewritten as the loss function of example Equation 8, below:

$$\text{loss}(ex) = -\sum_{i=1}^{K} \log[q_i(ex)]d_i(ex) + \lambda \text{Hoyer}(A) \qquad \text{Equation 8}$$

where A is a tensor that may include one or more (e.g., all) activation matrices in a forward pass through the NN model.

Embodiments of the invention may receive a NN model 30, that was pretrained to convergence, with or without the above regularization term in the loss. The term "pretrained" may be used in this context to indicate that the received NN model 30 may have been trained (e.g. using backpropagation as is known) to implement a specific task or function, such as a function pertaining to machine-learning as known in the art, before being handled, or retrained by embodiments of the present invention.

Embodiments of the invention may increase the activation sparsity of the received, pretrained NN model by (a) replacing one or more (e.g., all) of the activation functions in the NN model with FATReLU activations functions, as elaborated in Equation 1, and (b) fine-tune the FATReLU thresholds as elaborated herein, to enforce high activation sparsity (e.g., high sparsity of activation matrices 40') across one or more (e.g., all) layers 31 of NN model 30.

It may be appreciated by a person skilled in the art that the FATReLU function may not be easily simulated by adding a linear bias term to the ReLU activation function, since that would necessarily shift the value of x. In other words, one may naively apply a bias to output matrix 40, so as to shift the distribution of elements of output matrix 40 to be more negative, and increase sparsity of activation matrix 40'. However, such a bias may also decrease the value of high-valued elements of output matrix 40, and therefore affect the accuracy of NN model 30.

Additionally, as shown in FIG. 2, not only is FATReLU not differentiable, but it is not even continuous at (x=T). Thus, training a NN model "from scratch" using FATReLU instead of ReLU may be cumbersome, if not altogether impossible. However, it has been shown that by (a) starting from a pretrained NN model that includes, or is based on, ReLU activation functions, (b) replacing the ReLU activation functions with FATReLU activation functions, and (c) retraining the NN model using the FATReLU activation functions, the NN model's activation sparsity may be increased, while stability and accuracy of the NN model may be kept.

Embodiments of the invention may fix a small accuracy tolerance value, (e.g. 1%), and, for each layer, perform retraining of layer, to identify a maximal FATReLU threshold (e.g., element T of FIG. 2) for which the network accuracy loss remains below the tolerance threshold.

Additionally, or alternatively, embodiments of the invention may fix a small accuracy tolerance value, (e.g. 1%), and, for each layer, perform a static analysis to identify a maximal FATReLU threshold (e.g., element T of FIG. 2) for which the network accuracy loss remains below the tolerance threshold. The term "static analysis" may be used in this context to indicate a process in which weights of layers 31 of NN model 30 are not retrained, but instead are kept "frozen" or unchanged, while different threshold values T are attempted for the FATReLU activation function 315.

After FATReLU threshold T is determined for each layer, embodiments of the invention may run a small or number of fine-tuning training epochs, until either recovery is achieved (e.g., NN model 30 converges), or the procedure fails (e.g., NN model 30 diverges). According to example experimental results, the number of fine-tuning training epochs may be small in a sense that retraining often requires as little as 2 training epochs, and seldom requires more than 10 training epochs. Additionally, or alternatively, embodiments of the invention may run a limited or predetermined number of epochs, using a first FATReLU activation threshold and subsequently determine whether the NN is converging (e.g., if a measured accuracy value is within the accuracy tolerance value), or diverging (e.g., if the measured accuracy value is not within the accuracy tolerance value).

Using this success or failure criterion (e.g., the determination of convergence or divergence of the NN model), embodiments of the invention may perform a search, such as a linear or binary search, on the FATReLU activation threshold values to determine the largest FATReLU activation threshold for which recovery remains possible. For example, in a binary search process, if the NN is determined as converging, then embodiments of the invention may increase a value of the FATReLU activation threshold, and restart the retraining process with the new FATReLU activation threshold. In a complementary manner, if the NN is determined as diverging, then embodiments of the invention may decrease the value of the FATReLU activation threshold, and restart the retraining process with the new FATReLU activation threshold. This process may continue until a maximal value of the FATReLU activation threshold is found, where the NN model still converges. It may be appreciated that the largest FATReLU activation threshold value may correspond to the largest increase in activation sparsity (e.g., sparsity of activation matrix 40').

It has been experimentally shown, that in one example when retraining is applied in this manner, it is not uncommon for the NN model's 30 accuracy to increase for small increments of the FATReLU activation threshold.

Figure 5:
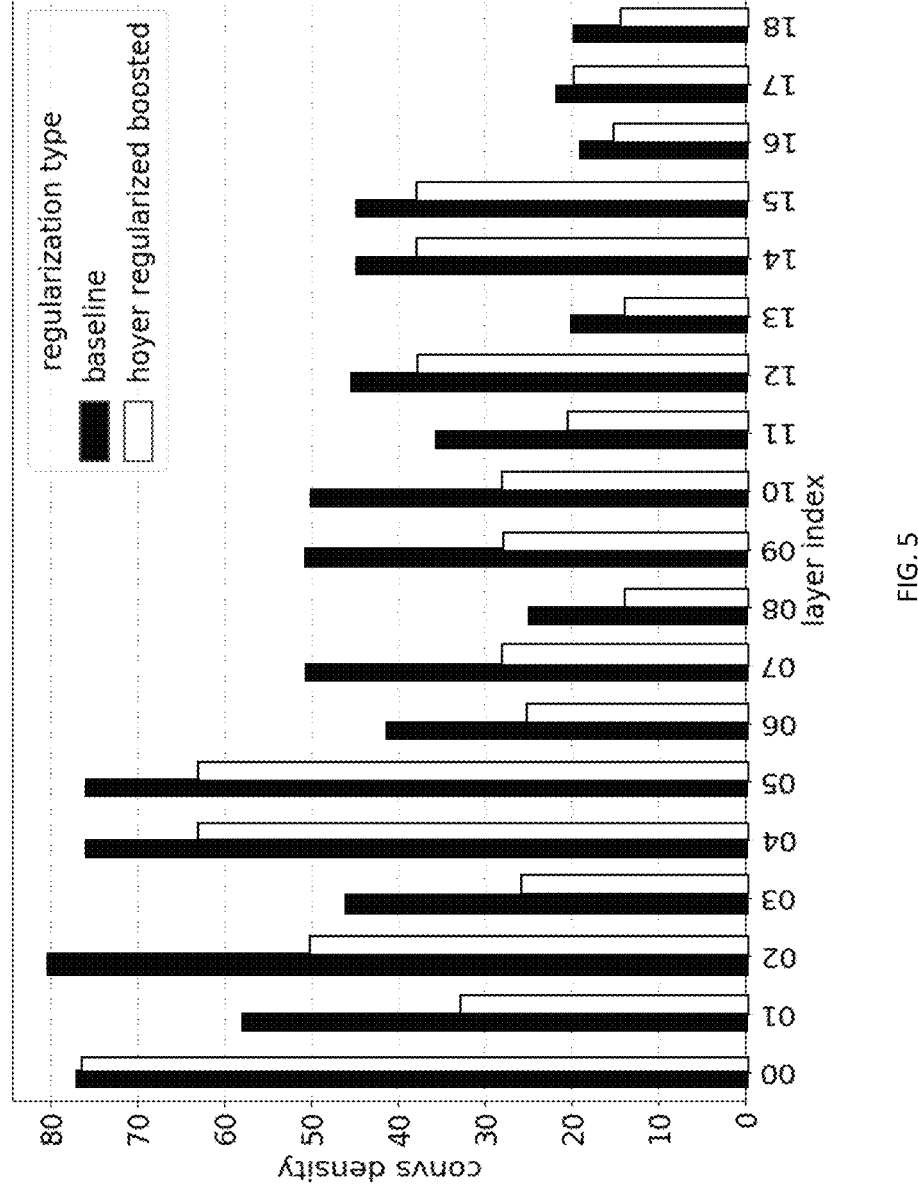
FIG. 5 is a graph, depicting a comparison of density of activation matrices of various layers of a ResNet18 NN model, between a baseline NN model, pretrained based on the ImageNet dataset, and the NN model after retraining according to embodiments of the present invention.

Reference is now made to FIG. 5, which is a graph, depicting a comparison of density of activation matrices of various layers of a ResNet18 NN model. The comparison is between a baseline NN model 30, pretrained based on the ImageNet dataset (black bars), and the NN model 30 after being retrained, according to embodiments of the present invention (white bars).

As shown in FIG. 5, the black bars represent density of non-zero activation matrices 40' for the baseline NN model 30, pertaining to each NN layer 31. The white bars represent density of non-zero activation matrices 40' for the same NN model 30, after using the Hoyer regularization factor, and the FATReLU activation function according to embodiments of the invention, as elaborated herein.

As clearly shown in FIG. 5, embodiments of the invention may increase activation sparsity of one or more (e.g., each) layer 31 of NN model 30. Additionally, it may be appreciated that no accuracy loss has been observed in NN model 30 between the pretrained, baseline version of NN model 30 and the retrained version of NN model 30.

As elaborated herein, embodiments of the invention may receive a pretrained NN model 30, and produce, e.g., during a training stage, a second version of the NN model 30, which has higher activation sparsity than that of the original, pretrained version of NN model 30. This increased sparsity may be exploited, e.g., during inference or execution, to boost (e.g., decrease latency) of NN computations.

For example, embodiments of the invention may create a NN 30 with certain functions, such as modified ReLU functions, which may create or induce activation sparsity during execution or inference. If such a high-activation-sparsity NN is executed at inference using certain techniques, inference processing may be more efficient and/or speeded. In addition, some embodiments may increase training efficiency or speed. Embodiments described in published US patent application 2020/0218978, published on Jul. 9, 2020, entitled "SYSTEM AND METHOD FOR EXECUTING CONVOLUTION IN A NEURAL NETWORK", incorporated by reference herein in its entirety, may be used with or by embodiments of the present invention to, at inference time, increase inference speed or efficiency based on activation sparsity.

Figure 6:
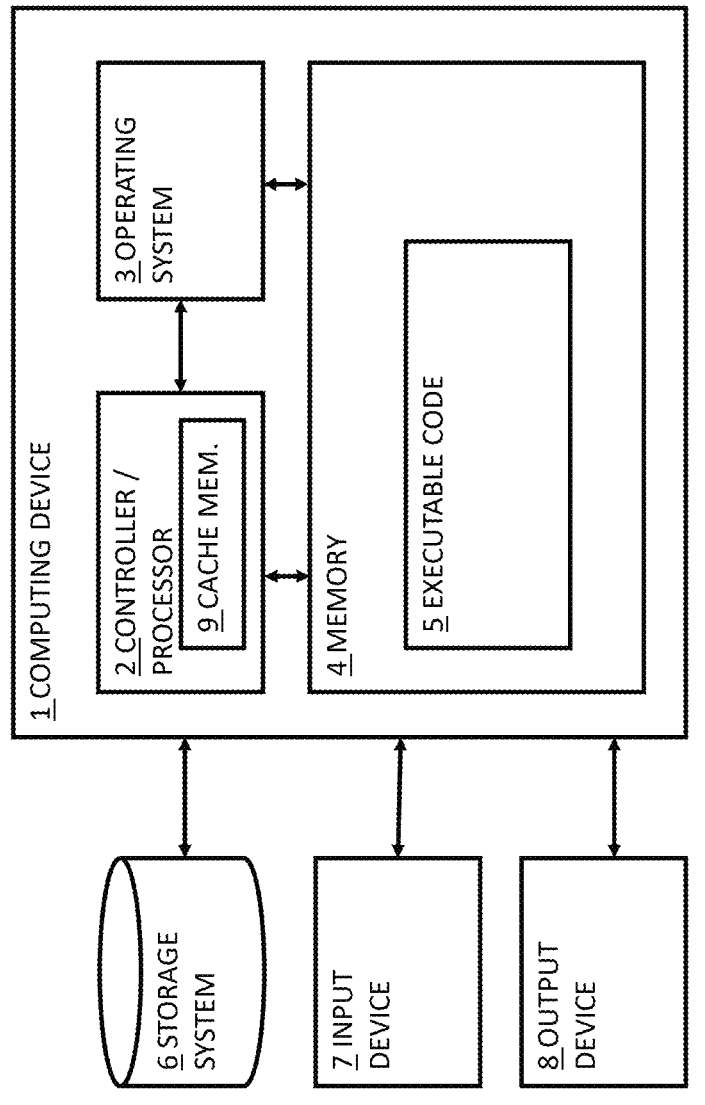
FIG. 6 is a block diagram, depicting a computing device, which may be included within an embodiment of a system for training a NN model, according to some embodiments.

Reference is now made to FIG. 6, which is a block diagram depicting a computing device, which may be included within an embodiment of a system for training a NN model, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of a system for training or executing a NN model according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may train a neural network, as further described herein. Although, for the sake of clarity, a single item of executable code 5 is shown in FIG. 6, a system for training a NN model according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to training of a neural network may be stored in storage system 6 and may be loaded from storage system 6 into memory 4 where it may be processed by processor or controller 2. In some embodiments, some of the components shown in FIG. 6 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system for training a NN model according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 7:
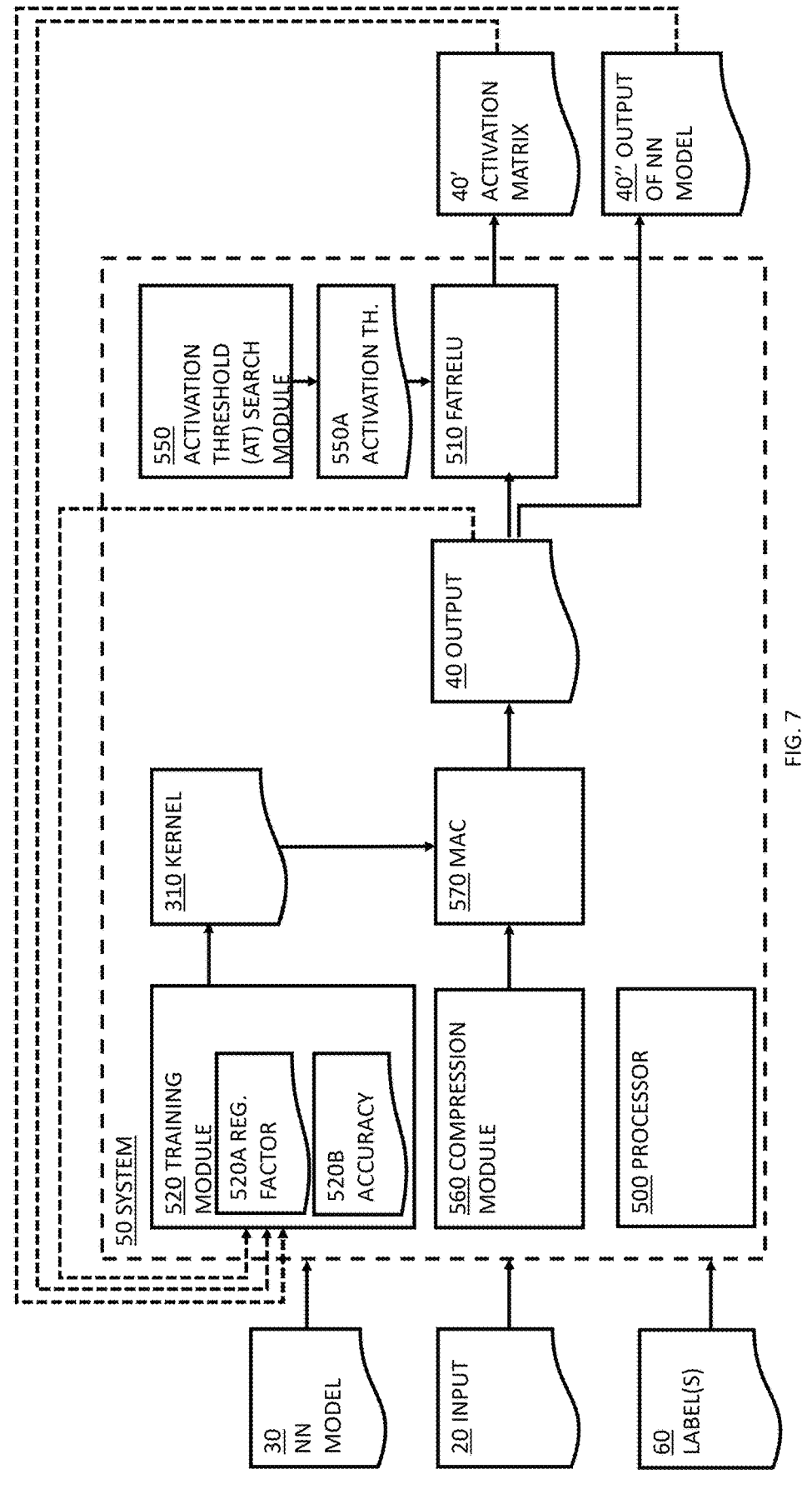
FIG. 7 is a block diagram, depicting a system for training or executing a NN model, according to some embodiments of the invention.

Reference is now made to FIG. 7, which is a block diagram depicting a system 50 for training and/or executing (e.g., inferring) a NN model 30, according to some embodiments of the invention. System 50 may be implemented as a software module, a hardware module or any combination thereof.

For example, system 50 may be or may include a computing device such as element 1 of FIG. 6, including a processor module 500, such as processor 2 of FIG. 6. Processor 500 may be adapted to execute one or more modules of executable code, such as element 5 of FIG. 6, to execute (e.g., train and/or infer) a NN model, as further described herein.

The arrows depicted in FIG. 7 show the flow of data between different modules of system 50. However, some arrows connecting between the different modules have been omitted, for the purpose of clarity.

As shown in FIG. 7, system 50 may receive a pretrained, original NN model 30. As elaborated herein, NN model 30 may be pretrained in a sense that it may be trained to perform a machine-learning based task or function (e.g., a function of face recognition in an image), prior to being handled by system 50. As elaborated herein, system 50 may be set forth to improve inference of the machine-learning based task or function on new, incoming input data elements 20 (e.g., new images).

As elaborated herein (e.g., in relation to FIGS. 1A and 1B), NN model 30 may include a plurality of layers 31, where at least one (e.g., each) layer 31 is associated with an activation matrix 40'.

For example, each layer 31 (e.g., a convolutional layer) of original NN model 30 may include a kernel 310 (e.g., kernel K), and may receive an input data element 20 (e.g., input matrix I). Layer 31 may perform computations on input data element 20 and kernel 310 to produce an output data element such as output matrix 40, as known in the art.

Each layer 31 of original, pretrained NN model 30 may also include, or be associated with an activation function (e.g., element 315 of FIG. 1B) such as an ReLU function that may produce an activation matrix 40' as a sparse version of output matrix 40.

According to some embodiments, system 50 may include a training module 520, adapted to retrain original, pretrained NN model 30, so as to produce a new, optimized version of NN model 30, as elaborated herein. The new version of NN model 30 may be referred to as optimized in a sense that embodiments may search for, and apply a maximal level of activation sparsity in one or more activation matrices 40' (e.g., pertaining to each layer 31) of NN model 30, and thus obtain higher throughput, or shorter latency in inference of the NN model 30 on new input examples 20.

According to some embodiments, training module 520 may perform the retraining process for one or more (e.g., all) layers 31 of NN model 30, simultaneously. Additionally, or alternatively, training module 520 may perform the retraining process iteratively, one layer at a time.

For example, training module 520 may select a first layer 31 of the plurality of layers 31 of NN model 30 and perform an iterative training process on the selected first layer (so as to adjust one or more NN weight values of the first layer), while "freezing" the other layers 31 (e.g., keeping the same, locking, or freezing values of NN weights of other layers 31) of NN model 30. Training module 520 may then move to a subsequent layer 31, and repeat the iterative training or retraining process with the subsequent layer 31, until NN model 30 is entirely retrained.

The retraining process may be referred to as iterative, as it may include a plurality of cycles, where each cycle includes training the relevant layer 31 while using a different activation threshold value, and finding the optimal activation threshold value for each layer as elaborated herein.

According to some embodiments, system 50 may replace one or more activation functions 315 (e.g., ReLU) of original NN model 30 with one or more respective FATReLU activation function modules 510. As elaborated herein (e.g., in relation to FIG. 2), the one or more FATReLU activation function modules 510 are configured to: (a) transfer an output value (e.g., element of output matrix 40) of layer 31 to the activation matrix 40' if it surpasses an activation threshold, and (b) transfer a null value to the activation matrix if it does not surpass the activation threshold.

System 50 may include an activation threshold search module 550, which may be configured to, in each cycle or iteration of the iterative retraining, select an activation threshold (e.g., element T of FIG. 2), for FATReLU activation function module 510.

As elaborated herein (e.g., in relation to FIG. 2) FATReLU activation function module 510 may implement or apply the selected activation threshold (T) on output matrix 40 of layer 31, so as to produce an activation matrix 40' that is a sparse version of output matrix 40. In other words, FATReLU activation function module 510 may apply the selected activation threshold to the activation matrix 40' of a selected layer, or alter activation matrix 40' using the threshold, for example by nullifying (e.g. setting to zero) elements of the activation matrix 40' that are below the activation threshold. In other words, FATReLU activation function module 510 may produce sparse activation matrix 40' of layer 31 by applying an FATReLU activation function on the output (e.g., output matrix 40) of layer 31. In other words, FATReLU activation function module 510 may allow a value of a neural node of layer 31 to be transmitted to a subsequent layer 31 of NN 30 if it surpasses the activation threshold value, and otherwise prevent the value of the neural node, from being transmitted to the subsequent layer 31 of NN 30.

According to some embodiments, in each iteration of the iterative retraining process, training module 520 may retrain the selected layer 31.

For example, NN model 30 may be a machine-learning based NN model 30, adapted to recognize faces in an image. Training module 520 may receive: (a) a plurality of input data elements 20, such as facial images, (b) the output 40 of the last output layer 31 of NN model 30 as feedback data (e.g., a classification of an image as depicting a specific person), and (c) supervisory or labelled data 60, as commonly referred to in the art. Supervisory data 60 may indicate the required classification, or "ground truth" output of NN model 30 (e.g., the known, true identity of the depicted person).

According to some embodiments, during each iteration of retraining of a selected layer 31, training module 520 may be adapted to calculate a cost, or loss function of the NN model, according to example Equation 8, rewritten below:

$$\text{loss}(ex) = -\sum_{i=1}^{K} \log[q_i(ex)]d_i(ex) + \lambda \text{Hoyer}(A) \qquad \text{Equation 8}$$

As shown in Equation 8, the loss value may include a first portion: (e.g., $\Sigma_{i=1}^{K} \log[q_i(ex)]d_i(ex)$), and a second portion: (e.g., $\lambda \text{Hoyer}(A)$).

It may be appreciated that the first portion of the loss function (e.g., $\Sigma_{i=1}^{K} \log[q_i(ex)]d_i(ex)$) corresponds to elements (a), (b) and (c) above:

(ex) is an input data example, which corresponds to (a)—input data element 20 of FIG. 7;

$q_i$ is the probability that a specific example is correctly classified as pertaining to class i, and thus corresponds to (b)—the output 40 of the last output layer 31 of FIG. 7; and $d_i(ex)$ is the "ground truth" classification, and thus corresponds to (c)—supervisory or labelled data 60 of FIG. 7.

Training module 520 may train or retrain NN model 30 in an effort to minimize a value (or an absolute value) of the loss function, as known in the art. Therefore, in relation to the first portion, (e.g., $\Sigma_{i=1}^{K}\log[q_i(ex)]d_i(ex))$, training module 520 may train the selected layer 31 based on (a), (b) and (c), according to a back-propagation training algorithm, as known in the art.

Additionally, and as shown in Equation 8, the loss function may include a second portion: $\lambda$ Hoyer(A), which is an activation regularization factor, denoted as activation regularization factor 520A in FIG. 7.

As elaborated herein, activation regularization factor 520A (e.g., the second portion of the loss value, (e.g., $\lambda$ Hoyer(A)) may be a bimodal regularization function, such as a squared Hoyer regularization function (e.g., as in Equation 2) of one or more (e.g., all) activation matrices 40' of NN model 30.

According to some embodiments, training module 520 may train or retrain at least one layer of NN model 30, using a bimodal regularization function (e.g., the squared Hoyer regularization function) as an activation regularization factor 520A, in an effort to minimize a value of the loss function. For example, training module 520 may perform gradient-based training of the selected NN layer 31 in an effort to decrease the value of the loss function, and decrease the value of the activation regularization factor 520A (e.g., the squared Hoyer regularization function).

As elaborated herein, and shown in FIG. 4C, the squared Hoyer regularization function may be adapted to increase sparsity of the activation matrix 40' of the selected layer during the training process.

In other words, by using the squared Hoyer regularization function as an activation regularization factor 520A during training, embodiments of the invention may not only fine-tune the training of the selected layer, but also increase the sparsity of the selected layer's activation matrix 40'.

Additionally, in each iteration of the iterative retraining process, training module 520 may measure, calculate or determine an accuracy value 520B of NN model 30. For example, pertaining to the example of face recognition, training module 520 may receive (b) and (c) above, and compute the accuracy of prediction (e.g., the percentage of accurately recognized image input data elements 20) of NN model 30, according to (b) and (c). For example, for each input data element 20 in a training dataset that includes N elements, the top class prediction in the last output 40 of NN model 30 may be compared to a labeled, "ground truth" classification 60. The total number of correct matches may be divided by the total number (N) of input examples 20 in the training dataset, to produce an average accuracy value 520B across the N data input 20 examples.

According to some embodiments, system 50 may repeat steps elaborated above (e.g., applying the activation threshold, retraining layer 31 and measuring accuracy 520B) for a plurality of cycles or repetitions, where each repetition uses different activation threshold 550A values from those used in the prior repetitions. Activation threshold search module 550 may subsequently determine an optimal activation threshold 550A value of the selected layer 31, based on the measured accuracy values 520B, as elaborated herein.

In other words, activation threshold search module 550 may determine a maximal value of the activation threshold, for which accuracy value 520B is above a predefined accuracy threshold value, as elaborated herein.

According to some embodiments, each iteration or repetition may correspond to a unique value of activation threshold 550A. For example, activation threshold 550A value can start from an initial value (e.g., 0) and increase in each iteration by a predefined quantity (e.g., 0.01). After each iteration, accuracy 520B may be measured or calculated, and compared with the baseline, to see if NN 30 has recovered from the retraining process (e.g., if accuracy 520B is still above a predefined threshold), or not. The highest value of activation threshold 550A, in which NN 30 has still recovered from the retraining process may be kept as the maximal, or optimal activation threshold 550A value.

Additionally, or alternatively, activation threshold search module 550 may employ a search algorithm, e.g., a binary search algorithm, to find the maximal, or optimal activation threshold 550A value across a predefined range (e.g., between 0 and 1.0) of activation threshold 550A values.

The determined activation threshold value 550A may be optimal, in a sense that it may be selected as a maximal activation threshold value 550A, among the plurality activation threshold values 550A of all repetitions, that correspond to a measured accuracy value 520B that exceeds a predefined accuracy threshold value.

According to some embodiments, activation threshold search module 550 may perform a search process, such as a linear search or a binary search, to find the optimal activation threshold value 550A of the selected layer 31. In each iteration of the retraining process, activation threshold search module 550 may allow training module 520 to perform a small, predefined number of training cycles or epochs of NN model 30. Following this training, activation threshold search module 550 may compare the measured accuracy value 520B to a predefined accuracy limit value.

For example, in a binary search process, if the measured accuracy value exceeds the predefined accuracy limit value, then activation threshold search module 550 may increase activation threshold 550A (T) by a predetermined value. Otherwise, activation threshold search module 550 may decrease activation threshold 55A (T) by a predetermined value. According to some embodiments, the values to search between may be chosen according to the distribution of the activation values before applying the FATReLU activation function. For example, the range may be between 0.0 and the mean value of activation matrix 40'.

In another example, in a linear search process, activation threshold 550A may begin at an initial value (e.g., 0) and may increase by a predetermined value (e.g., 0.01) until accuracy value 520B falls below a predetermined accuracy threshold. Activation threshold search module 550 may then allow training module 520 to resume training, e.g., run a new training cycle of the predefined number of epochs, using the new activation threshold T value. In this way, activation threshold search module 550 may find the maximal activation threshold T value, that does not cause the measured accuracy value to fall below the predefined accuracy limit value.

According to some embodiments, after the optimal or maximal activation threshold value is determined (thus obtaining maximal sparsity of the activation matrix 40'), and the selected layer 31 is retrained as elaborated herein, training module 520 may proceed to repeat the iterative training process with one or more second layers of the NN model. Thus, system 50 may determine an activation threshold value for one or more (e.g., all) layers 31 of NN model 30.

Figure 8:
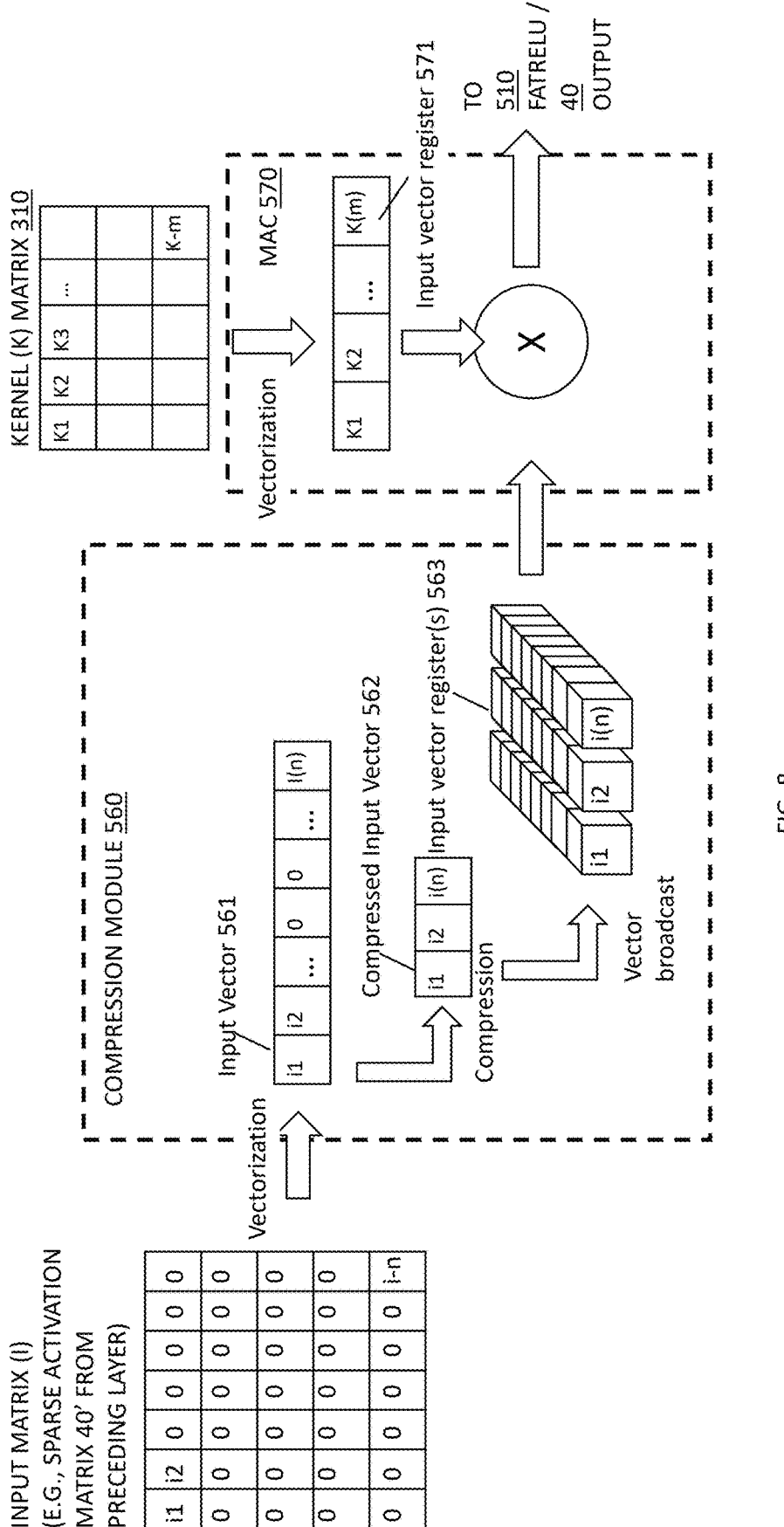
FIG. 8 is a schematic block diagram, depicting inference of at least one layer of NN model on input data, according to some embodiments of the invention.

Reference is also made to FIG. 8, which is a schematic diagram, depicting inference of at least one layer 31 of NN model 30 on input data.

As elaborated above (e.g., in relation to FIG. 1), layer 31 (e.g., a convolutional layer) may receive an input data element, such as an input matrix I. For example, input matrix I may originate, or may be output from a preceding layer 31 of NN model 30. Referring to the example of FIG. 1A and FIG. 1B, an input matrix I of layer 31B may be a sparse activation matrix 40' of a preceding layer, 31A.

Additionally, or alternatively, elements of input matrix I may be or may represent the content of nodes of a preceding layer 31, which correspond to non-zero elements of the activation matrix 40' of the preceding layer. In the example of FIG. 8, elements of input matrix I are denoted i1, i2, . . . i(n).

Layer 31 may include a kernel K matrix (e.g., 310), whose individual elements are denoted K1, K2 . . . K(m). Layer 31 may be adapted to infer, or apply kernel K (e.g., matrix 310) on the incoming input data element I (e.g., matrix 40' of preceding layer 31, or input 20 of FIG. 7).

For example, as known in the art, computations of a NN layer such as a convolutional layer may include performing a plurality of multiply-and-accumulate (MAC) operations between elements of input matrix I and elements of Kernel K. As elaborated herein, embodiments of the invention are adapted maximize sparsity of the activation matrices of NN 30. As made clear by FIG. 8, embodiments of the invention may benefit from this maximized sparsity, by reducing the number of elements in input matrix I, reducing the number of required MAC computations, and thus improving the throughput and/or latency of NN model 30 execution.

As shown in FIG. 7, system 50 may include a compression module 560. As shown in FIG. 8, compression module 560 may be adapted to receive input matrix I (e.g., matrix 40' of preceding layer 31), organize or vectorize input matrix I, to produce an input vector 561, and compress input vector 561, to produce a compressed input vector 562. Compressed input vector 562 may be referred to as compressed, in a sense that it may only represent non-zero values of input matrix I. For example, compressed input vector 562 may only include or represent non-zero values of activation matrix 40' of preceding layer 31.

According to some embodiments of the invention, compression module 560 may implement a Compressed Sparse Row (CSR) algorithm on the input vector, as known in the art, to produce the non-zero representation of compressed input vector 562. In other words, compression module 560 may apply a CSR algorithm on a vector comprising content of nodes of a layer 31 of NN model 30, to produce a non-zero representation of the nodes of layer 31.

According to some embodiments of the invention, processor 500 may be associated with one or more vector registers, and may be adapted to perform vector MAC operations between a plurality of elements in a first vector register and a corresponding plurality of elements in a second vector register.

Compression module 560 may broadcast the non-zero elements of input matrix I into a first register vectors. In other words, compression module 560 may compress the content of nodes of the preceding layer 31, that correspond to non-zero elements of the activation matrix 40' of the preceding layer 31, into a first vector register.

Additionally, MAC module 570 may vectorize and load elements of kernel matrix 310 (K) of layer 31 into a second vector register 571. MAC module 570 may then infer kernel matrix 310 (K) of layer 31 on input I (e.g., on content of nodes of the preceding layer) by performing a vector MAC operation between the first vector register and the second vector register.

In other words, MAC module 570 may infer the retrained version of NN 30 on an input data element 20, using the sparse activation matrix 40' of at least one layer 31 of retrained NN model 30.

As shown in FIG. 8, the output of MAC 570 may be an output data element such as an element of output matrix 40 of FIG. 7.

If layer 31 is the last layer of NN model 30, then this output element of output matrix 40 may serve as an output 40" of NN model 30 (e.g., output of the last layer of NN model 30). Output 40" may, for example be used by training module to further calculate or measure accuracy value 520B as elaborated herein.

Additionally, or alternatively, during a training process, output 40 may be transferred to FATReLU 510, where an activation threshold T may be applied to it, so as to produce activation matrix 40', as elaborated herein.

Reference is now made to FIG. 9, which is a schematic flow diagram, depicting a method of training a neural network model by at least on processor, according to some embodiments of the invention.

As shown in step S1005, the at least one processor (e.g., processor 500 of FIG. 7) may receive a pretrained NN model (e.g., NN model 30 of FIG. 7), including a plurality of layers (e.g., layers 31 of FIG. 1). At least one (e.g., each) layer 31 of FIG. 30 may be associated with an activation matrix (e.g., activation matrix 40' of FIG. 1B).

As shown in step S1010, processor 500 may select a first layer 31 of the plurality of layers 31 of NN model 30.

As shown in step S1015, processor 500 may include, or may collaborate with a training module (e.g., training module 520 of FIG. 7) to perform an iterative training process of the first layer, as elaborated herein (e.g., in relation to FIG. 7).

According to some embodiments of the invention, and as depicted in FIG. 9, the iterative training process may be described by steps S1020-S1040:

As shown in step S1020, processor 500 may collaborate with an activation threshold search module (e.g., element 550 of FIG. 7) to apply an activation threshold (e.g., element 550A of FIG. 7) to the activation 40' matrix of the first layer.

As shown in step S1025, processor 500 may collaborate with training module 520 to measure or calculate an accuracy value 520B of NN model 30, as elaborated herein (e.g., in relation to FIG. 7).

As shown in step S1030, processor 500 may collaborate with training module 520 to retrain or fine tune weights of the first layer, as elaborated herein (e.g., in relation to FIG. 7). According to some embodiments of the invention, training module 520 may retrain at least one layer of the NN, while using a bimodal regularization function, such as a square Hoyer function as a regularization factor, as elaborated herein (e.g., in relation to Equation 8).

As shown in step S1035, processor 500 may repeat steps S1020-S1030 (e.g., the applying, measuring and retraining), where each repetition corresponds to, or uses different activation threshold values 550A from the prior repetitions.

As shown in step S1040, based on the measured accuracy values 520B, processor 500 may determine an optimal activation threshold value 550A of the first layer, as elaborated herein. It may be appreciated that the optimal activation threshold value 550A may correspond to a maximal sparsification level of activation matrix 40', which still produces satisfactory (e.g., beyond a predefined threshold) accuracy value 520B.

Processor may proceed to retrain other (e.g., all) layers 31 of NN model 30, as elaborated herein, to determine the optimal activation threshold value 550A of other layers 31 of NN model 30.

As elaborated herein, e.g., in relation to FIG. 8, embodiments of the invention may proceed to infer the retrained version of NN model 30 on incoming input data elements, using the optimal activation threshold (e.g., the maximally sparsified activation matrix 40') of the at least one layer 31.

Embodiments of the invention include a practical application for implementing neural network computation.

Embodiments of the invention may boost or improve the technology of executing (e.g., training and/or inferring) neural network by applying novel algorithms of sparsification of input, and/or activation matrices in layers of the neural networks, as elaborated herein.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of training a neural network (NN) model by at least on processor, the method comprising:
  receiving a pretrained NN model, comprising a plurality of layers, each layer associated with an activation matrix representing activation values for neurons in the layer;
  selecting a first layer of the plurality of layers; and
  performing an iterative training process on the first layer, wherein said iterative training process comprises:
    applying an activation threshold to the activation matrix of the first layer, wherein the activation threshold defines a value which, for an activation output value not exceeding the activation threshold, a null value is placed in the activation matrix in place of the activation output value;
    measuring an accuracy value of the NN model;
    retraining the first layer; and
    repeating the applying, measuring and retraining, each repetition using different activation threshold values from the prior repetitions; and
    based on the measured accuracy values from each repetition, determining an activation threshold value of the first layer, wherein determining the activation threshold value comprises selecting a maximal activation threshold value, among the different activation threshold values of all repetitions, that corresponds to a measured accuracy value that exceeds a predefined accuracy threshold.

2. The method of claim 1, wherein applying the activation threshold to the activation matrix comprises nullifying elements of the activation matrix that are below the activation threshold.

3. The method of claim 1 further comprising, during an inference stage:
  compressing content of nodes of the first layer, that correspond to non-zero elements of the activation matrix, into a first vector register;
  loading elements of a kernel matrix of a subsequent layer into a second vector register; and
  inferring the kernel matrix of the subsequent layer on content of nodes of the first layer by performing a vector multiplication and accumulation (MAC) operation between the first vector register and the second vector register.

4. The method of claim 1, wherein retraining the first layer comprises:
  calculating a loss function of the NN model; and
  performing gradient-based training of the first NN layer, based on the loss function, wherein the loss function comprises an activation regularization factor, adapted to increase sparsity of the activation matrix of the first layer.

5. The method of claim 4, wherein the activation regularization factor comprises a bimodal regularization function of one or more activation matrices of the NN model.

6. The method of claim 5, wherein the bimodal regularization function is a squared Hoyer function.

7. The method of claim 1, wherein retraining the first layer further comprises training the first layer so as to adjust one or more NN weight values of the first layer, while freezing values of NN weights of other layers of the NN model.

8. The method of claim 1, further comprising repeating the iterative training process with one or more second layers of the NN model, to determine an activation threshold value of the one or more second layers.

9. The method of claim 1, wherein applying an activation threshold to the activation matrix comprises:
  allowing a value of a neural node of the layer to be transmitted to a subsequent layer of the NN if it surpasses the activation threshold value; and
  otherwise preventing the value of the neural node, from being transmitted to the subsequent layer of the NN.

10. A method of training a NN model by at least on processor, the method comprising:
  receiving a pretrained NN model;
  retraining at least one layer of the NN, while using a bimodal regularization function as a regularization factor, wherein the retraining comprises:
    applying an activation threshold to an activation matrix of the at least one layer, wherein the activation threshold defines a value which, for an activation output value not exceeding the activation threshold, a null value is placed in the activation matrix in place of the activation output value;
    measuring an accuracy value of the NN model;
    training the at least one layer; and
    repeating the applying, measuring and training, each repetition using different activation threshold values from the prior repetitions; and
    based on the measured accuracy values from each repetition, determining an activation threshold value of the at least one layer, wherein determining the activation threshold value comprises selecting a maximal activation threshold value, among the different activation threshold values of all repetitions, that corresponds to a measured accuracy value that exceeds a predefined accuracy threshold;
  producing an activation matrix representing activation values for neurons in the at least one layer by applying an activation function on the output of the layer, wherein the activation function comprises the determined activation threshold; and inferring the NN on an input data element, using the activation matrix of the at least one layer.

11. The method of claim 10 wherein the activation function is configured to: (a) transfer an output value of the at least one layer to the activation matrix if it surpasses the activation threshold, and (b) transfer a null value to the activation matrix if the output value does not surpass the activation threshold.

12. The method of claim 10 wherein selecting the maximal activation threshold value comprises:

a. training the NN model in a predetermined number of training epochs;

b. determining whether the NN model is converging or diverging, based on the calculated accuracy value;

c. increasing or decreasing the activation threshold based on said determination; and d. repeating steps (a) through (c), until a maximal value of the activation threshold, where the NN model still converges, is found.

13. A system for training a NN model, the system comprising: a non-transitory memory device, wherein modules of instruction code are stored, and at least one processor associated with the memory device, and configured to execute the modules of instruction code, whereupon execution of said modules of instruction code, the at least one processor is configured to:

receive a pretrained NN model, comprising a plurality of layers, each layer associated with an activation matrix representing activation values for neurons in the layer;

select a first layer of the plurality of layers; and perform an iterative training process on the first layer, wherein said iterative training process comprises:

applying an activation threshold to the activation matrix of the first layer, wherein the activation threshold defines a value which, for an activation output value not exceeding the activation threshold, a null value is placed in the activation matrix in place of the activation output value;

measuring an accuracy value of the NN model;

retraining the first layer;

repeating the applying, measuring and retraining, each repetition using different activation threshold values from the prior repetitions; and based on the measured accuracy values from each repetition, determining an activation threshold value of the first layer, wherein determining the activation threshold value comprises selecting a maximal activation threshold value, among the different activation threshold values of all repetitions, that corresponds to a measured accuracy value that exceeds a predefined accuracy threshold.

14. The system of claim 13, wherein the at least one processor is further configured to retrain the first layer by:

calculating a loss function of the NN model; and performing gradient-based training of the first NN layer, based on the loss function, wherein the loss function comprises a bimodal regularization function.

15. The system of claim 14, wherein the bimodal regularization function is a square Hoyer function of one or more activation matrices of the NN model.

16. The system of claim 15, wherein the bimodal regularization function is adapted to change a distribution of output elements the first layer, so as to split these elements into a high-end modality and a low-end modality.

17. The system of claim 13 wherein the at least one processor is further configured to, during an inference stage:

compress content of nodes of the first layer, that correspond to non-zero elements of the activation matrix, into a first vector register;

load elements of a kernel matrix of a subsequent layer into a second vector register; and infer the kernel matrix of the subsequent layer on content of nodes of the first layer by performing a vector MAC operation between the first vector register and the second vector register.

18. The system of claim 17, wherein compressing content of nodes of the first layer comprises applying a Compressed Sparse Row (CSR) algorithm on a vector comprising content of nodes of the first layer, to produce a non-zero representation of the nodes of the first layer.

\* \* \* \* \*